INVENTORS
ROBERT S. CURRY JR.
EDWIN F. POTTER
RALPH R. ROVER JR.
BY REUBEN P. SNODGRASS
ATTORNEY

INVENTORS
ROBERT S. CURRY JR.
EDWIN F. POTTER
RALPH R. ROVER JR.
BY REUBEN P. SNODGRASS
ATTORNEY

INVENTORS
ROBERT S. CURRY JR.
EDWIN F. POTTER
RALPH R. ROVER JR.
BY REUBEN P. SNODGRASS
ATTORNEY

INVENTORS
ROBERT S. CURRY JR.
EDWIN F. POTTER
RALPH R. ROVER JR.
REUBEN P. SNODGRASS

BY S. C. Yeaton
ATTORNEY

INVENTORS
ROBERT S. CURRY JR.
EDWIN F. POTTER
RALPH R. ROVER JR.
BY REUBEN P. SNODGRASS
S. C. Yeaton
ATTORNEY United States Patent Office 3,339,203
Patented Aug. 29, 1967

3,339,203
WINDSCREEN TYPE DISPLAY APPARATUS

Robert S. Curry, Jr., Baldwin, and Edwin F. Potter, St. James, N.Y., Ralph R. Rover, Jr., Cresskill, N.J., and Reuben P. Snodgrass, Lake Ronkonkoma, N.Y., assignors to Sperry Rand Corporation, Great Neck, N.Y., a corporation of New York Filed Feb. 1, 1965, Ser. No. 429,399
16 Claims. (Cl. 343—108)

Figure 1:
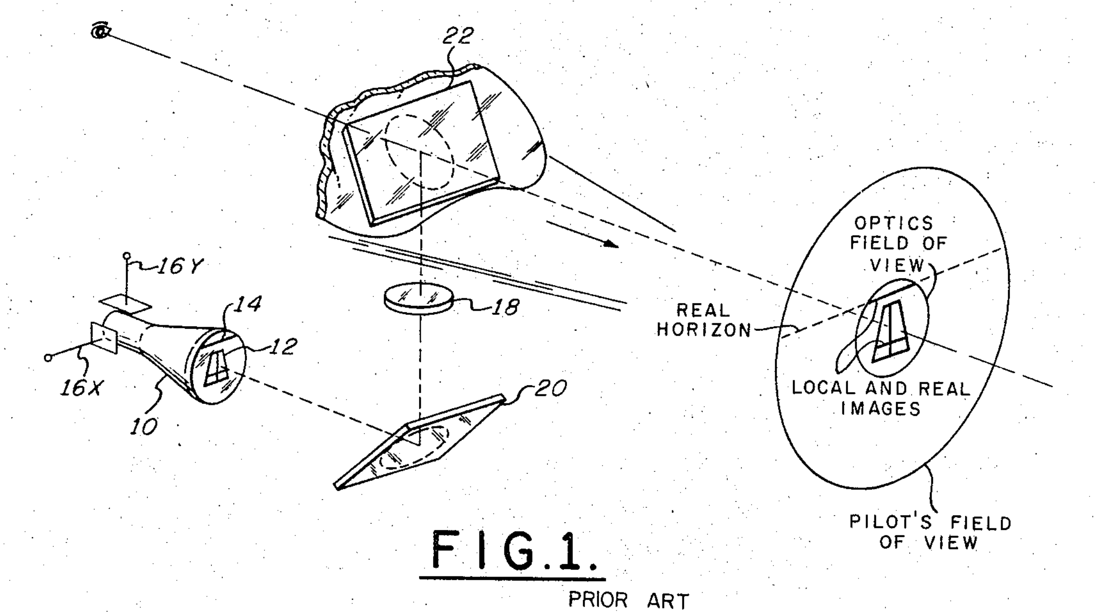
FIG. 1. PRIOR ART

This invention relates in general to aircraft instruments and in particular to improvements to windscreen type display apparatus of the kind wherein locally produced landing cues are stabilized with respect to images of related real world objects and are displayed to a pilot to appear at optical infinity. Display apparatus of this type are coming to be well-known, being described in particular in copending application S.N. 164,769, filed Jan. 8, 1962 now U.S. Patent No. 3,237,193 issued Feb. 22, 1966.

More specifically, application 164,769 describes display apparatus wherein, for example, a runway configuration and a horizon line are incribed on the face of a cathode ray tube (C.R.T.) by means of computed signals, and wherein such inscribed images are positioned on the tube face by means of certain bias signals. The present invention relates solely to these latter (bias) signals, and in no way concerns itself with the computer-generation of specific lines on the cathode ray tube face. In other words, the concern here is with the positioning of lines, rather than in their generation, and for this reason reference hereafter is made solely to the bias signals.

A principal object of the invention is to provide windscreen display apparatus for aircraft wherein the longitudinal axis of a cathode ray tube and its associated collimating optical system hereinafter referred to as the C.R.T. longitudinal axis only may be aimed with respect to the craft fuselage reference line, and whereby the display on the C.R.T. depends on its operation.

Another object of the invention is to provide windscreen apparatus for aircraft wherein the longitudinal axis of a C.R.T. is aimable about the craft yaw axis in accordance with craft drift angle, and whereby the display on the face of the C.R.T. depends on the orientation of the C.R.T. longitudinal axis.

Another object of the invention is to provide windscreen display apparatus for aircraft wherein the longitudinal axis of a C.R.T. is aimable about the craft pitch axis in accordance with craft angle of attack, and whereby the display on the C.R.T. depends on the orientation of said C.R.T. longitudinal axis.

Another object of the invention is to provide windscreen display apparatus for aircraft wherein the longitudinal axis of a C.R.T. is aimable about the craft yaw axis in accordance with craft drift angle and about the craft pitch axis in accordance with craft angle of attack, and whereby the display on the C.R.T. depends on the orientation of said C.R.T. longitudinal axis.

Another object of the invention is to provide windscreen display apparatus for aircraft wherein a C.R.T., biased to position a locally produced image as an overlay on a real world object, may be angularly positioned about orthogonal craft axes, whereby signals representative of such angular positions are provided and algebraically added to the biases so that the field of view seen on the C.R.T. face may be changed depending on its angular orientation.

Another object of the invention is to provide windscreen display apparatus for aircraft wherein a C.R.T., biased to position a locally produced image as an overlay on a real world object, may be angularly positioned about the craft yaw axis in accordance with craft drift angle and about the craft pitch axis in accordance with craft angle of attack, and whereby signals representative of such angular positions are provided and algebraically added to the biases so as to keep the local image continually in the field of view seen by the C.R.T.

Figure 2:
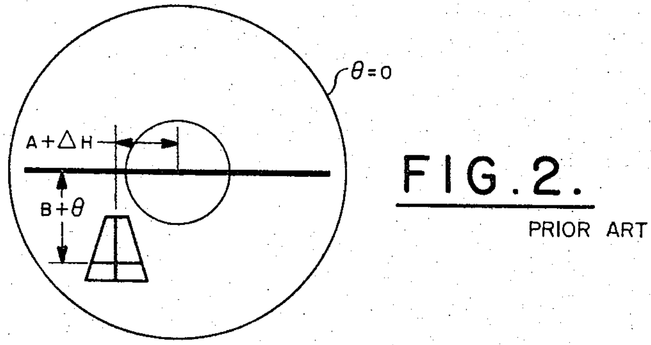
FIG. 2. PRIOR ART
Figure 3:
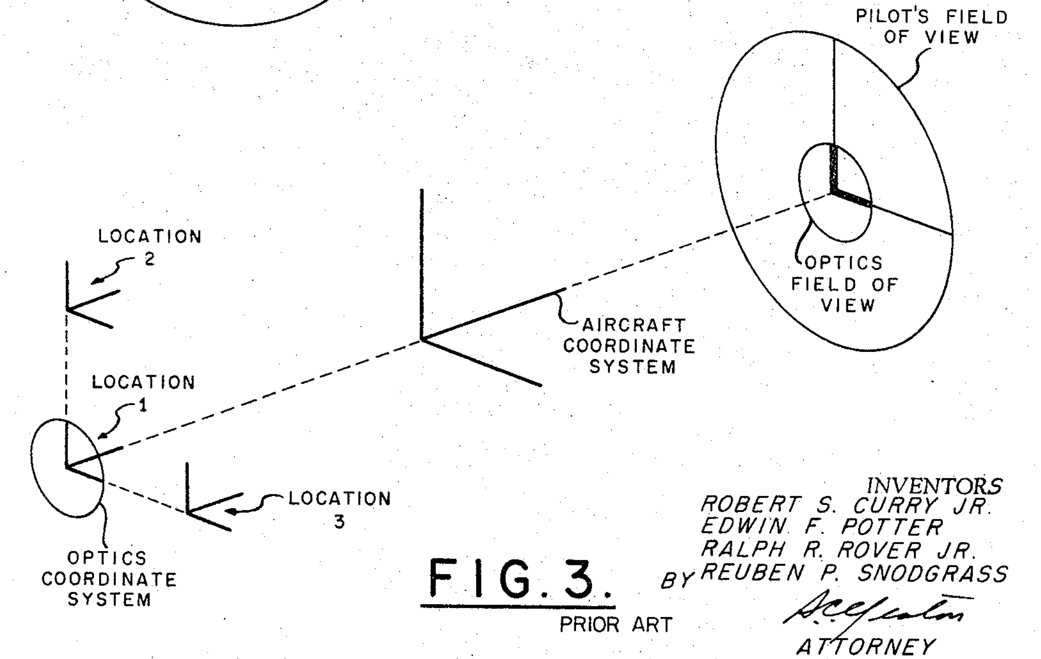
FIG. 3. PRIOR ART
Figures 4A, 4B:
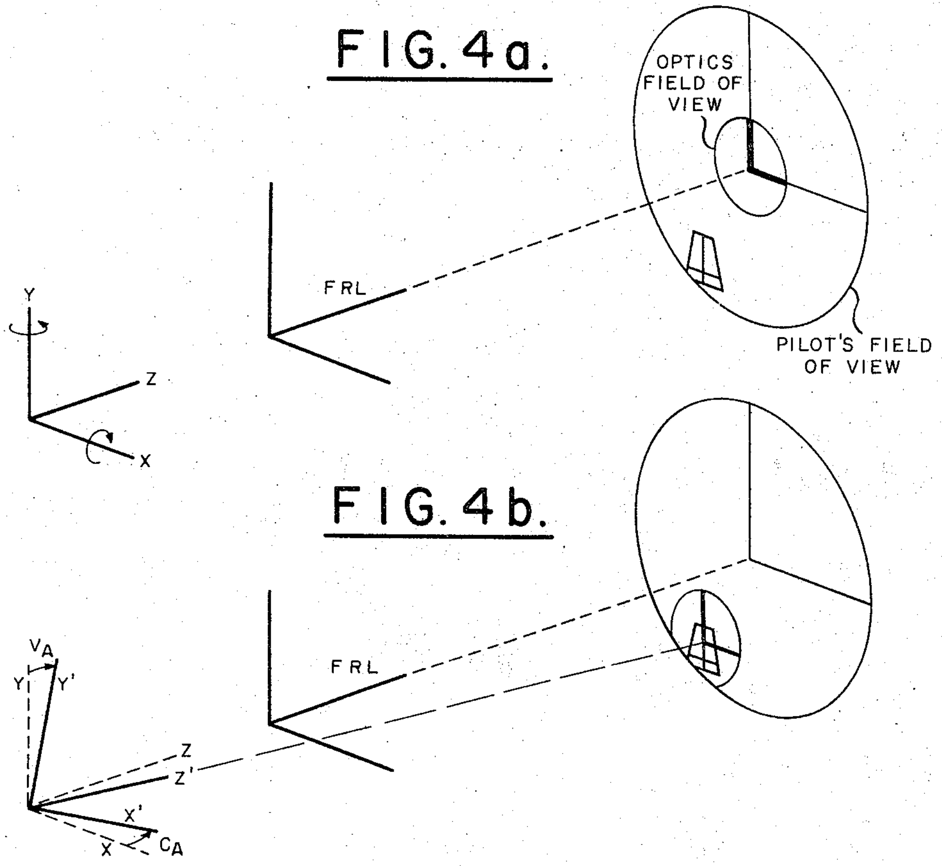
Figure 5:
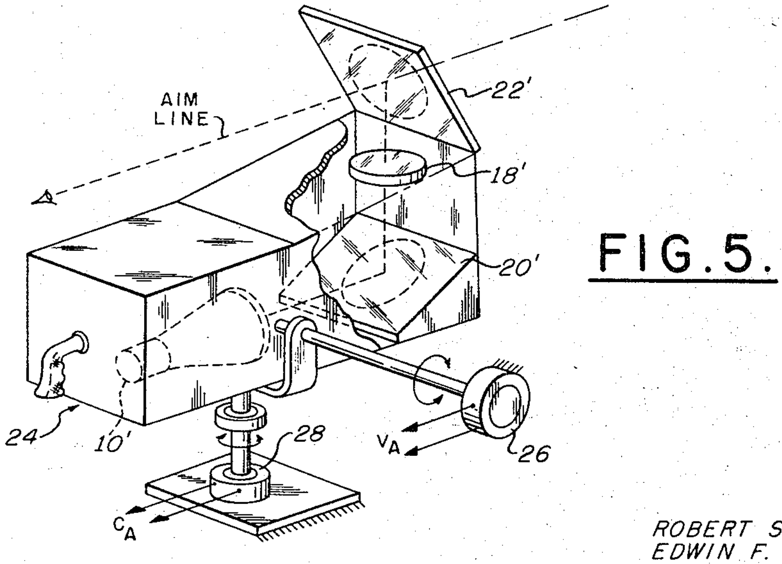
Figure 6:
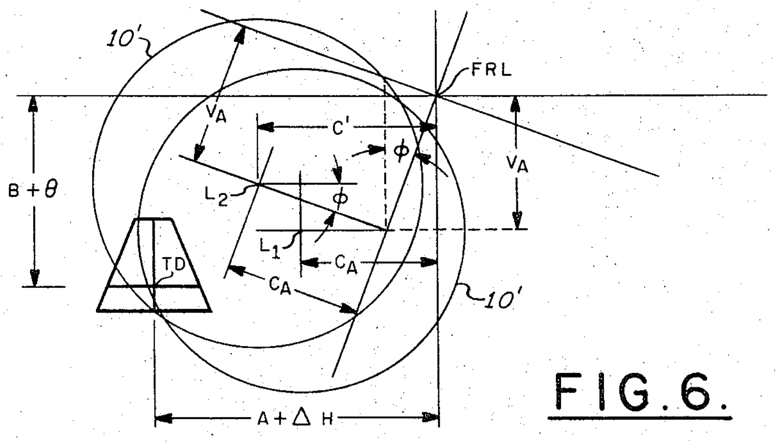
Figure 7:
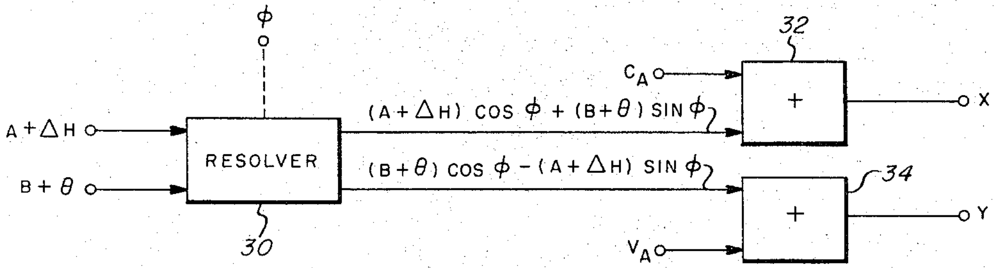
Figure 8:
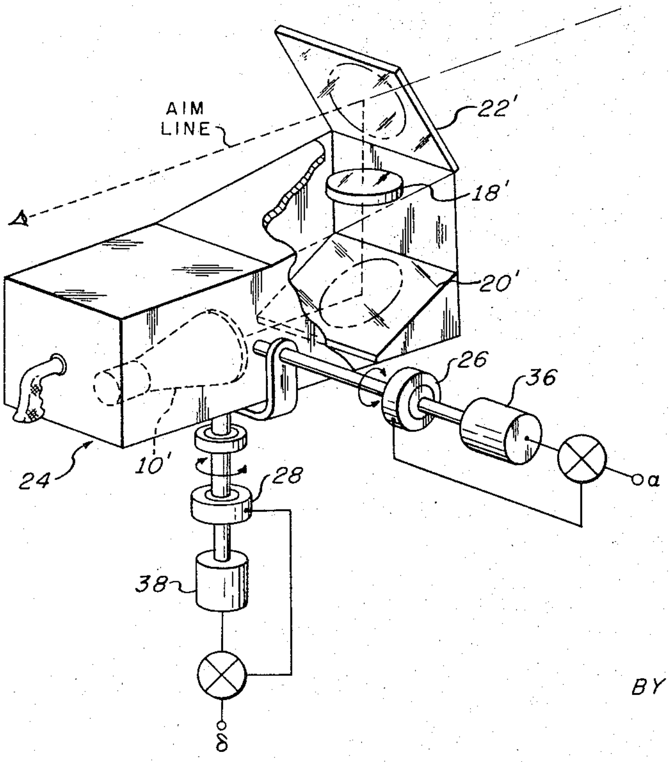
Figure 9:
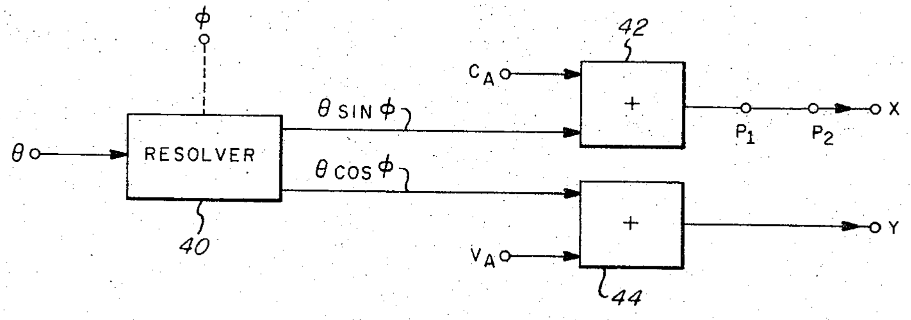
Figure 12:
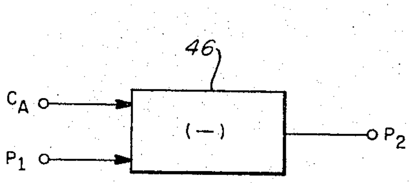
Figure 13:
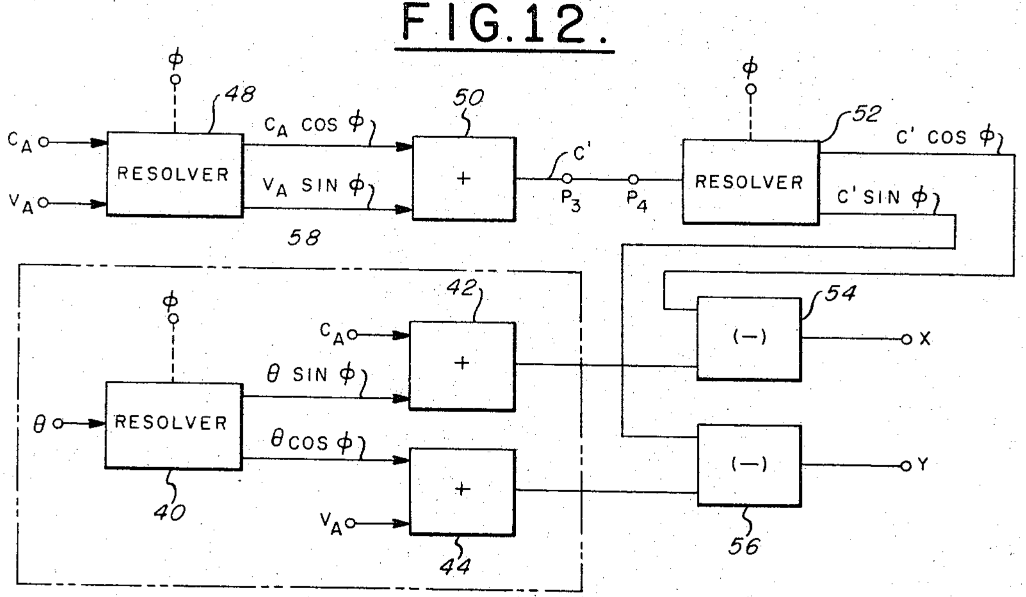
Figure 14:
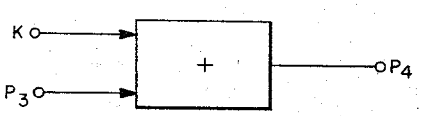
Figure 10:
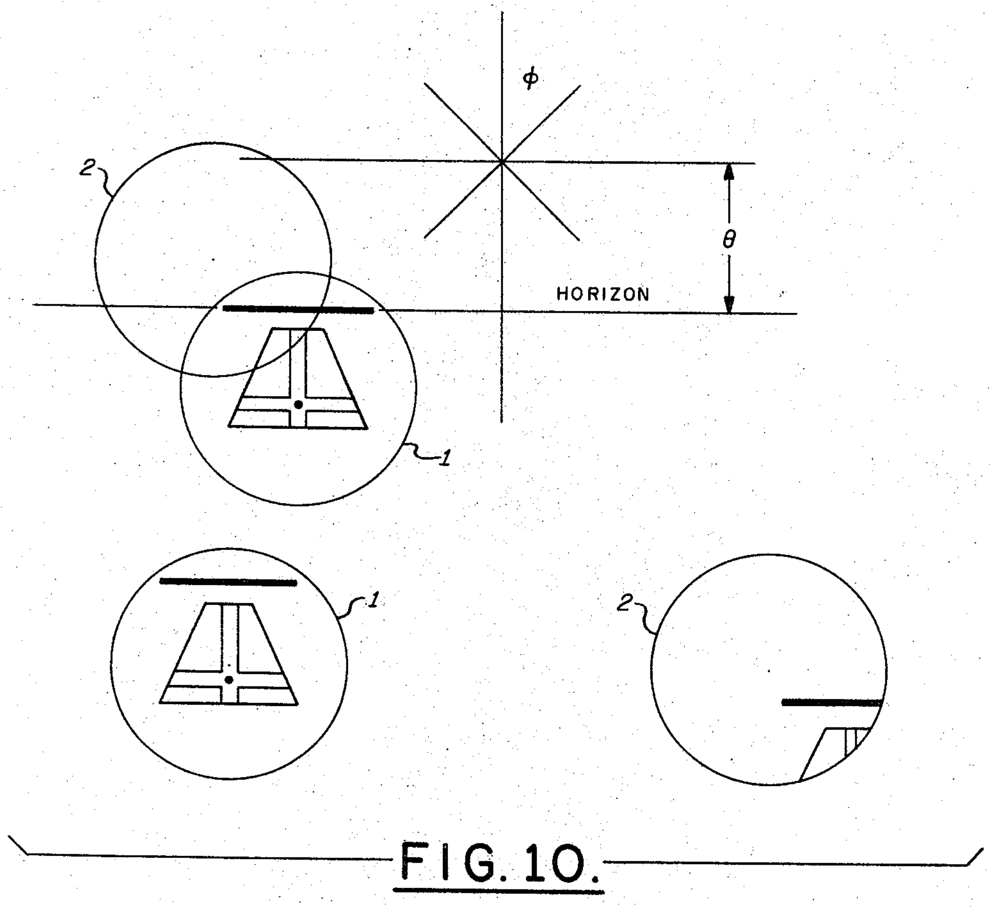
Figure 11A:
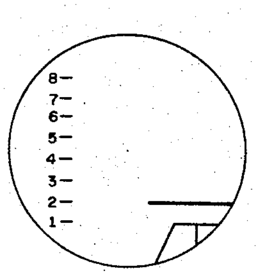
Figure 11B:
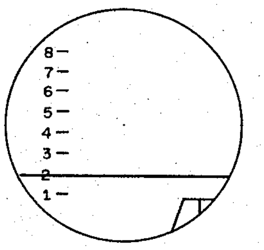

The invention will be described with reference to the figures wherein:

FIG. 1 is a schematic diagram showing generally the apparatus of the prior art,

FIG. 2 is a diagram useful in describing a shortcoming of prior art windscreen display apparatus, FIG. 3 is a diagram for indicating that the location of the prior art optics is of no effect in changing the view seen by the optics, FIGS. 4*a* and 4*b* are diagrams useful in showing how the field of view seen by the optics of prior art windscreen display apparatus may be varied, FIG. 5 is a view showing aimable optics according to the instant invention, FIG. 6 is a diagram useful in describing the apparatus depicted in FIG. 5, FIG. 7 is a block diagram indicating how the apparatus of the instant invention is made compatible with prior art windscreen display devices, FIG. 8 is a block diagram showing aimable optics according to the instant invention whereby a real world runway is held always in the field of view of such optics, FIG. 9 is a block diagram depicting how the horizon line of prior art windscreen display apparatus is made poistionable according to the invention, FIG. 10 is a diagram which shows that, even with the invention, the resulting presentation still leaves much to be desired, FIGS. 11*a* and 11*b* are diagrams useful in emphasizing why the display depicted in FIG. 10 is objectionable, FIG. 12 is a block diagram of a circuit which when incorporated into the apparatus of FIG. 9 partially eliminates the problem depicted in FIG. 10, FIG. 13 is a block diagram of a circuit for use in laterally positioning a horizon line on the face of a C.R.T. whereby the problem depicted by FIG. 10 is completely eliminated, and FIG. 14 is a block diagram of a circuit which may be used to stabilize cues laterally anywhere on the face of a C.R.T. which cues are, however, vertically stabilized with respect to real world coordinates.

Referring to FIG. 1, a system generally as described in application 164,769 has a cathode ray tube 10 onto whose face a runway configuration 12 and a horizon line 14 are inscribed by signals appearing on the beam deflecting elements 16X and 16Y. The C.R.T. images have their light rays collimated by means of a lens 18, which rays are directed to the eyes of a pilot by means of a mirror 20 and a semi-reflecting glass 22. Suitable biases, as described heretofore in copending application 164,769 discussed again later, cause the runway and horizon images on the C.R.T. 10 to appear as 1:1 overlays on related real world images thereof (which images are also seen at optically infinity), assuming of course that the computed signals applied to the deflection elements 16 are properly representative of the real world image dimensions.

FIG. 1 shows that the actual angular field of view of the pilot is substantially greater than the field (i.e. the optics field of view) that is placed on the tube face to be projected to the pilot. This is a limitation caused by practical restrictions to the sizes of the C.R.T. 10 and the optical components 18, 20 and 22. So long, therefore, that the runway appears dead ahead of the fuselage reference line (F.R.L.), and so long as the optics are boresighted with the fuselage reference line, i.e. aimed parallel to it, the runway is seen within both the field of view of the pilot and within the field of view of the optics, and no problem appears.

Examine however (FIG. 2) what happens when the craft F.R.L. and boresighted optics are skewed with respect to the runway. Here, the runway appears within the view of the pilot, but without the view of the optics. That is, the biasing signals $(B+\theta)$ and $(A+\Delta H)$ as defined in copending application 164,769 drive the runway image off the tube face so that it is not projected to the pilot. Translating the optics but retaining its axial parallel to the F.R.L. as shown by FIGURE 3 will be ineffectual in bringing the runway image onto the tube face for the reason that both the view seen by the pilot and the view seen by the optics are at optical infinity and follow each other much as the moon appears to follow the moving observer. Therefore, the presentation of FIG. 2 will be unchanged for each of the optics locations of FIG. 3.

To avoid the above-described deficiency of the prior art, the present invention proposes the "aimability" of the optics system, whereby the optics field or view may be moved about as desired. FIGS. 4*a* and 4*b* show in relation to the presentation of FIG. 2 how this may be done: By angularly moving the optics about its X and Y axes, its Z axis may be aimed directly at the runway, whereby the runway may appear on the tube face; in angularly moving the optics about its Y axis, the optics are aimed sideways with respect to the F.R.L. by an angular quantity $C_A$; by angularly moving the optics about its X axis, the optics are aimed downward with respect to the F.R.L. by a quantity $V_A$.

FIG. 5 shows an embodiment of an aimable optics system according to the invention. A C.R.T. 10, the deflection circuits of which are adapted to receive the figure-generating computed signals described in copending application 164,769, and the figure-positioning bias signals which locate the generated figures as overlays on related real world figures, is supported within a housing 24. The housing 24 is positionable about X and Y axes, and supports a reflecting mirror 20', collimating lens 18' and semi-transparent combining glass 22'. X and Y axis pick-offs 26 and 28 are provided for the aimable optics to produce output signals $V_A$ and $C_A$ respectively to indicate angular departures of the optics with respect to the craft F.R.L.

As to the use of the apparatus of FIG. 5, consider for the moment that $V_A$ and $C_A$ are zero, i.e. the optics are boresighted, and that the real world runway with respect to the F.R.L. appears as shown by FIG. 2. That is, the locally produced runway image here is biased as an overlay off the tube 10' face by $(B+\theta)$ and $(A+\Delta H)$. By now aiming the optics, for example, at the real world location $L_1$ (see FIG. 6) the locally produced runway can be brought as an overlay into the optics field of view, if (importantly) the roll resolved bias signals derived from $(B+\theta)$ and $(A+\Delta H)$ are proportionately cancelled respectively by the signals $V_A$ and $C_A$. Rolling the craft, as shown in FIG. 6, so that the aim point for the optics moves to a real world location $L_2$ has no effect on the quantity $V_A$ and $C_A$ for the reason that the optics and aircraft are coordinate systems which are fixed with respect to each other.

FIG. 7 shows how the above principles may be employed with the prior art image positioning techniques to provide resultant bias signals for desired image overlays for aimable optics. A resolver circuit 30, serving as the prior art coordinate transformation means for proper image positioning during aircraft roll maneuvers, receives the signal $(A+\Delta H)$ and $(B+\theta)$ to provide bias signals $(A+\Delta H)\sin\phi+(B+\theta)\cos\phi$ and $(B+\theta)\sin\phi+(A+\Delta H)\cos\phi$ to locate the runway image aim point TD with respect to boresighted optics. The signals $C_A$ and $V_A$, as provided by the pick-offs 28 and 26 respectively, are applied to summing devices 32 and 34 to cancel algebraically the resolved positioning bias signals which in the prior art get applied to the tube 10' X and Y deflection circuits. Therefore, regardless of where the optics are aimed, the tube deflection circuits are always properly baised to keep the locally produced runway image overlaying the real world image. While the optics are described as being positionable about orthogonal craft axes, it is done so only to give a complete picture of the invention; naturally, the optics may be fixedly positioned about one craft axis while being positionable about the other, depending on the effect desired.

While FIG. 5 shows a positionable optics system, it is to be noted that the principal cause of lateral and vertical nonalignment of the craft F.R.L. with the runway are respectively craft drift angle and angle of attack, drift angle being the angle between the craft ground track vector and the lateral component of its velocity vector within the air mass. Accordingly, in a presently preferred form of the invention (see FIG. 8) the positioning of the optics is done automatically, whereby the runway is kept always in the view seen on the tube 10' face once the aircraft is coupled to and is dynamically stable on the approach path. That is, a servo 36 angularly positions vertically the housing 24 of the aimable optics about the optics X axis in accordance with the angle of attack signal $\alpha$; and a servo 38 angularly positions sideways the housing 24 about the optics Y axis in proportion to a drift angle signal $\delta$.

While producing corrective biases for the aiming of the optics at the runway is of primary concern, corrective biases for properly positioning cues such as the horizon line must also be employed. As shown by FIG. 9, this is had by resolving, i.e. the prior art coordinate transformation taught in application 164,769, in a resolver 40 the horizon line positioning signal $\theta$ into sine and cosine functions thereof; then in accordance with the present invention, quantities $C_A$ and $V_A$ are algebraically added respectively to the sine and cosine terms in adders 42 and 44, whereby a given part of the horizon is made to overlay always a particular part of the real world horizon regardless of the aiming of the optics.

As it turns out using the above described teaching, the presented display for optics aimed off the craft fuselage reference line, leaves much to be desired during roll maneuvers of the craft (see FIG. 10) because the display horizon line, being stabilized with respect to a particular part of the real world horizon, tends objectionably to slide off the tube face as the craft rolls from FIG. 10 position 1 to position 2. Aside from this presentation being objectionable from an aesthetic point of view, the horizon line in the usual display serves as a reference line for scales and the like, e.g. a craft altitude scale, on the tube face and when the horizon line moves sideways away from the scale (see FIG. 11*a*) it makes reading the scale that much more difficult. Accordingly, it had been practiced in the prior art to cancel (during horizon image generation) the corrective signal $C_A$ and thereby have the locally produced horizon line stabilized only with respect to the Y axis (i.e. the vertical) earth coordinates (see FIG. 11*b*), the theory here being that one part of the horizon is like all others as far as overlay techniques are concerned, and it makes no difference whether the generated horizon line moves along the real world horizon. In other words, the location of the local horizon line is defined only in the vertical plane. Cancelling the corrective signal $C_A$ may be achieved by connecting the subtracting circuit 46 of FIG. 12 between points $P_1$ anl $P_2$ of FIG. 9, whereby only the signal $V_A$ gets applied to correct, for non-boresight situations, the biases applied to the tube 10' deflection circuits for positioning the locally produced horizon line.

This technique for stabilizing the horizon line on the face of the tube, however, only partially elminates the problem, i.e. while shifting of the horizon line on the tube face during roll maneuvers is not as great as before, shifting nevertheless still occurs. This may be appreciated from a reexamination of FIGS. 6 and 9: During roll maneuvers, even though $C_A$ here is applied during the display time of the horizon to cancel $C_A$, a signal $\theta \sin \phi$ gets applied to the X axis tube deflection circuits to keep the local horizon line overlaying the real world horizon. This bias signal $\theta \sin \phi$ results in an undesirable sideways shift on the tube face of the local horizon line. To eliminate this condition the present invention proposes that the horizon trace actually be laterally stabilized with respect to the tube face (i.e. forced to locate always at the lateral center of the tube face), while being as in the past stabilized vertically with respect to real world coordinates. To accomplish this, the term $C_A$ here is not cancelled by the equal quantity $C_A$, thereby leaving the horizontal positioning of the trace ill-defined, but is instead cancelled in accordance with a term C' (see FIG. 6, where $C'=C_A \cos \phi+V_A \sin \phi$) which defines the location of the center of the tube face laterally in space. Because the correction must always be in the plane of the horizon, the quantity C' must itself be roll resolved into cos and sin functions thereof, whereby such terms are applied respectively to the X and Y deflection axes of the tube and thereby keep the correction operating always in the horizontal plane.

FIG. 13 embodies the principles just discussed re FIG. 6 and includes a resolver circuit 48 adapted to receive the signal quantities $C_A$ and $V_A$ provided respectively by the pick-offs 28 and 26, such resolver circuit producing and applying the signal quantities $C_A \cos \phi$ and $V_A \sin \phi$ to a summing element 50. Elements 48 and 50 may be embodied in the form of a simple resolver, the sine and cosine windings of which are respectively excited by $V_A$ and $C_A$, and the rotor of which is positioned as a function of craft roll $\phi$. The summing element 50, i.e. resolver rotor winding, applies its sum signal (C') to a roll resolver circuit 52, whereby the X and Y axis corrective signals (viz. $C' \cos \phi$ and $C' \sin \phi$ respectively) may be provided, and by which correction for the term $C_A$ may be continually had in the plane of the horizon. The corrective signals are applied respectively to substraction elements 54, 56, which are in turn each respectively adapted to receive the X and Y axis bias signals produced by the circuit 58 as depicted by FIG. 9.

While the quiescent point for the location of the horizon line trace is described as being at the center of the tube face, obviously other points on the tube face may be similarly defined. This is desirable, for example, to keep scales and other cues which have no lateral relation to the real world always fixedly positioned laterally on the tube face regardless of craft roll. Accordingly, the summing circuit of FIG. 14 may be connected between points $P_3$ and $P_4$ of FIG. 13, whereby fixed lateral locations (depending on the magnitude of a fixed bias K) on the tube face may be defined.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In an aircraft windscreen display system of the type wherein a cathode ray tube has its X and Y deflection circuits biased to position a runway image on its face in accordance with respective lateral and vertical angular displacements of the craft from a real world runway, and said system includes cooperating optics for collimating the light from the cathode ray tube images and directing same toward the eyes of a pilot, wherein the improvement comprises, means for angularly positioning said collimated light about axes parallel to the craft pitch and yaw axes, first means cooperating with said cathode ray tube and optics for producing a first signal representative of the angular displacement of said collimated light from a predetermined reference position about an axis parallel to the craft pitch axis, which angular displacement is taken with respect to the craft fuselage reference line, second means cooperating with said cathode ray tube and optics for producing a second signal representative of the angular displacement of said collimated light from a predetermined reference position about an axis parallel to the craft yaw axis, which last named angular displacement is also taken with respect to the craft fuselage reference line, means for algebraically combining said first signal with the Y deflection circuit bias for positioning the runway image along one axis of the tube face, and means for algebraically combining the second signal with the X deflection circuit for positioning the runway image along a different axis of the tube face.

2. The system of claim 1 further including means for providing a craft angle of attack signal and a craft drift angle signal, wherein the improvement further includes, first and second servo means respectively cooperating with said first and second signal producing means and being responsive respectively to said angle of attack signal and said drift angle signal to position angularly said collimated light.

3. Windscreen display apparatus for use in cooperation with the instrument landing system comprising a cathode ray tube adapted to have a runway image inscribed on its face, said apparatus having means for vertically positioning the runway image on the tube face in proportion to the craft pitch attitude and craft departure from the defined glide slope course and means for laterally positioning the runway image on the tube face in proportion to craft heading with respect to the heading of the real world runway and craft departure from the defined localizer course, wherein the improvement comprises, means for pivoting the longitudinal axis of said cathode ray tube about axes parallel to the craft pitch and yaw axes, means for use in producing a first signal representative of the pivoting of the longitudinal axis of said cathode ray tube about an axis parallel to the craft pitch axis, which pivoting is taken with respect to an axis parallel to the craft longitudinal axis, means for use in producing a second signal representative of the pivoting of the axis of said cathode ray tube about an axis parallel to the craft yaw axis, which latter pivoting is also taken with respect to an axis parallel to the craft longitudinal axis, means for algebraically altering the vertical positioning of said runway image in proportion to said first signal, and means for algebraically altering the lateral position of said runway image to said second signal.

4. The apparatus of claim 3 further including means for providing a craft angle of attack signal and means for providing a craft drift angle signal, wherein the improvement further includes first servo means adapted to receive said angle of attack signal for pivoting the axis of said cathode ray tube in pitch, and second servo means adapted to receive said drift angle signal for pivoting the axis of said cathode ray tube in yaw.

5. In an aircraft windscreen display apparatus of the type wherein a cathode ray tube is biased to position a runway image on its face in accordance with lateral and vertical angular displacement of the craft from a real world runway, and wherein said apparatus includes cooperating optics for collimating the light from the cathode ray tube images and directing same toward the eyes of a pilot, first means cooperating with said cathode ray tube and optics for use in angularly positioning said collimated light with respect to the craft fuselage reference line about an axis parallel to the craft pitch axis and producing a signal representative of that position, and means for algebraically combining said signal with the cathode ray tube bias for vertically positioning the runway image on the tube face.

6. In an aircraft windscreen display apparatus of the type wherein a cathode ray tube is biased to position a runway image on its face in accordance with lateral and vertical angular displacements of the craft from a real world runway, and wherein said apparatus includes cooperating optics for collimating the light from the cathode ray tube images and directing same toward the eyes of a pilot, means cooperating with said cathode ray tube and optics for use in angularly positioning said collimated light with respect to the craft fuselage reference line about an axis parallel to the craft yaw axis and producing a signal representative of that position, and means for algebraically combining said signal with the cathode ray tube bias for laterally positioning the runway image on the tube face.

7. The apparatus of claim 5 further including means for providing a craft angle of attack signal, wherein the improvement further includes, said means cooperating with said cathode ray tube and optics being a servo responsive to said angle of attack signal.

8. The apparatus of claim 6 further including means for proviring a signal representing the craft drift angle, wherein the improvement further includes, said means cooperating with said cathode ray tube and optics being a servo responsive to said drift angle signal.

9. Windscreen display apparatus for use in cooperation with the instrument landing system comprising a cathode ray tube adapted to have a runway image inscribed on its face, means for vertically positioning the runway image on the tube face in proportion to the craft pitch attitude and the craft departure from the instrument landing system defined glide slope, means for laterally positioning the runway image on the tube face in proportion to craft heading with respect to the real world runway heading and craft departure from the instrument landing system defined localizer course, means for use in pivoting the axis of said cathode ray tube about an axis parallel to the craft pitch axis and producing a signal representative of such pivoting taken with respect to an axis parallel to the craft longitudinal axis, and means for algebraically altering the vertical positioning of said runway image in proportion to said signal.

10. Windscreen display apparatus for use in cooperation with the instrument landing system comprising a cathode ray tube adapted to have a runway image inscribed on its face, means for vertically positioning the runway image on the tube face in proportion to the craft pitch attitude and craft departure from the instrument landing system defined glide slope, means for laterally positioning the runway image on the tube face in proportion to craft heading with respect to the real world runway heading and the craft departure from the instrument landing system defined localizer course, means for use in pivoting the axis of said cathode ray tube about an axis parallel to the craft yaw axis and producing a signal representative of such pivoting taken with respect to an axis parallel to the craft longitudinal axis, and means for algebraically altering the lateral positioning of said runway image in proportion to said second signal.

11. The apparatus of claim 9 further including means for providing a signal representing craft angle of attack, wherein the improvement further includes, said means for pivoting the axis of said cathode ray tube being a servo adapted to receive said angle of attack signal.

12. The apparatus of claim 10 further including means for providing a signal representing the craft drift angle, wherein the improvement further includes, said means for pivoting the axis of said cathode ray tube being a servo adapted to receive said drift angle signal.

13. In a windscreen display system for aircraft, apparatus for producing resultant image locating biases for application respectively to the X and Y deflection circuits of a cathode ray tube that cooperates with an optical system having a collimating optics axis that may be oriented with respect to the craft fuselage reference line, means for providing a roll signal representative of the roll angle of said aircraft, wherein the improvement comprises means for producing a first signal proportional to the angular vertical displacement with respect to the craft fuselage reference line of a given real world figure, the image of which is to be located with respect to a point on the cathode ray tube face, means for producing a second signal proportional to the angular lateral displacement with respect to the craft fuselage reference line of said real world figure, resolving means responsive to said roll signal and said first and second signals for resolving said first signal into roll cosine and sine functions thereof, for resolving said second signal into roll cosine and sine functions thereof, and for algebraically combining the cosine function of said first signal and the sine function of said second signal into a first bias signal and for algebraically combining into a second bias signal the cosine function of said second signal and the sine function of said first signal, means for angularly positioning said collimating optics axis about axes parallel to the craft pitch and yaw axes, means for producing a third signal representing the angular orientation of said optics axis about an axis parallel to the craft pitch axis, means for producing a fourth signal representing the angular orientation of said optics axis about an axis parallel to the craft yaw axis, means for algebraically combining the first and third signals to produce a first resultant bias for application to the tube Y deflection circuit, and means for algebraically combining the second and fourth signals to produce a second resultant bias for application to the tube X deflection circuit.

14. The apparatus of claim 13 wherein said real world figure is that of a runway, and wherein said apparatus further includes means for providing positioning biases for a second figure, that of a horizon, and means for providing a signal representing the craft pitch attitude, wherein the improvement further includes means for resolving said pitch signal into cosine and sine functions thereof, means for algebraically combining said last-named cosine function signal with said third signal to produce a horizon positioning bias for application to said tube Y deflection circuit, and means for applying the sine function signal of said pitch signal resolving means as a bias to said X deflection circuit of said tube.

15. In a windscreen display apparatus for aircraft of the type wherein a cathode ray tube and cooperating optics for collimating the light from the cathode ray tube direct an image of a collimated horizon line to the eyes of a pilot, and wherein signals $C_A$ and $V_A$ representing the lateral and vertical angular orientations respectively of the collimated image with the longitudinal axis of the aircraft are available, apparatus for positioning said horizon line on the cathode ray tube face, means for producing a pitch signal representative of the craft pitch attitude, means for providing a roll signal representative of the craft roll angle, wherein the improvement comprises resolving means responsive to said pitch and roll signals for producing roll resolved cosine and sine signal functions of the craft pitch attitude, means for providing a signal representing the sum of the signal $C_A$ multiplied by the cosine of said roll signal and the signal $V_A$ multiplied by the sine of said roll signal, resolving means for roll resolving said sum signal into cosine and sine functions thereof, means for algebraically combining the cosine function of said sum signal, the sine function of said pitch signal, and the signal $C_A$ into a first resultant signal for application to the X deflection circuit of said cathode ray tube, and means for algebraically combining the sine function of said sum signal, the cosine function of said pitch signal, and the signal $V_A$ into a second resultant signal for application to the Y deflection circuit of said tube.

16. In a windscreen display apparatus for aircraft of the type wherein a cathode ray tube and cooperating optics for collimating the light from the cathode ray tube direct a collimated image of a cue to the eyes of a pilot, and wherein signals $C_A$ and $V_A$ repesenting the lateral and vertical angular orientations respectively of the collimated image with the longitudinal axis of the aircraft are available, apparatus for positioning said cue on the cathode ray tube face, means for producing a pitch signal representative of the craft pitch attitude, means for providing a roll signal representative of the craft roll angle, wherein the improvement comprises resolving means responsive to said pitch and roll signals for producing roll resolved cosine and sine functions of an angular quantity for vertically locating said cue with respect to real world coordinates, means for producing a constant signal the magnitude of which depends on the desired lateral location on said tube face for said cue, means for providing a signal representing the sum of said constant signal, the signal $C_A$ multiplied by the cosine of said roll signal, and the signal $V_A$ multiplied by the sine of said roll signal, means for resolving said sum signal into cosine and sine functions thereof, means for algebraically combining the cosine function of said sum signal, the sine function of said angular quantity signal, and the signal $C_A$ into a first resultant signal for application to the X deflection circuit of said cathode ray tube, and means for algebraically combining the sine function of said sum signal, the cosine function of said angular quantity signal, and the signal $V_A$ into a second resultant signal for application to the Y deflection circuit of said cathode ray tube.

References Cited

UNITED STATES PATENTS

| | | | |
|---|---|---|---|
| 2,887,927 | 5/1959 | Newton | 343—108 |
| 3,128,623 | 4/1964 | Gold | 343—108 |
| 3,237,193 | 2/1966 | Curry et al. | 343—108 |
| 3,242,493 | 3/1966 | Westerback | 343—108 |

RODNEY D. BENNETT, *Primary Examiner.*

CHESTER L. JUSTUS, *Examiner.*

H. C. WAMSLEY, *Assistant Examiner.*